United States Patent
Shin et al.

(10) Patent No.: US 11,424,440 B2
(45) Date of Patent: Aug. 23, 2022

(54) NEGATIVE ELECTRODE ACTIVE MATERIAL FOR LITHIUM SECONDARY BATTERY, METHOD FOR PREPARING THE SAME AND LITHIUM SECONDARY BATTERY OBTAINED BY USING THE SAME

(71) Applicant: LG CHEM, LTD., Seoul (KR)

(72) Inventors: Sun-Young Shin, Daejeon (KR); Yong-Ju Lee, Daejeon (KR); Je-Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 291 days.

(21) Appl. No.: 16/632,645

(22) PCT Filed: Dec. 19, 2018

(86) PCT No.: PCT/KR2018/016253
§ 371 (c)(1),
(2) Date: Jan. 21, 2020

(87) PCT Pub. No.: WO2019/124980
PCT Pub. Date: Jun. 27, 2019

(65) Prior Publication Data
US 2020/0168891 A1 May 28, 2020

(30) Foreign Application Priority Data
Dec. 19, 2017 (KR) .................. 10-2017-0175510

(51) Int. Cl.
| | | |
|---|---|---|
| *H01M 4/133* | (2010.01) | |
| *H01M 4/131* | (2010.01) | |
| *H01M 4/134* | (2010.01) | |
| *H01M 4/1391* | (2010.01) | |
| *H01M 4/1393* | (2010.01) | |
| *H01M 4/1395* | (2010.01) | |
| *H01M 4/62* | (2006.01) | |
| *H01M 10/0525* | (2010.01) | |
| *H01M 4/02* | (2006.01) | |

(52) U.S. Cl.
CPC .......... *H01M 4/133* (2013.01); *H01M 4/131* (2013.01); *H01M 4/134* (2013.01); *H01M 4/1391* (2013.01); *H01M 4/1393* (2013.01); *H01M 4/1395* (2013.01); *H01M 4/622* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 2012/0244428 A1 | 9/2012 | Park et al. |
| 2014/0050983 A1 | 2/2014 | Kim et al. |
| 2014/0234535 A1 | 8/2014 | Lee et al. |
| 2015/0140434 A1 | 5/2015 | Jung |
| 2016/0190552 A1 | 6/2016 | Murata et al. |
| 2016/0365567 A1* | 12/2016 | Troegel ............... H01M 4/386 |
| 2017/0133682 A1 | 5/2017 | Kang et al. |
| 2017/0200943 A1 | 7/2017 | Kawakami |
| 2017/0373308 A1* | 12/2017 | Katou .................. H01M 4/583 |
| 2018/0090750 A1 | 3/2018 | Oh et al. |
| 2018/0190975 A1 | 7/2018 | Ishii et al. |

FOREIGN PATENT DOCUMENTS

| | | |
|---|---|---|
| CN | 1937288 A | 3/2007 |
| CN | 105981206 A | 9/2016 |
| EP | 2899782 A1 | 7/2015 |
| JP | 2010-170943 A | 8/2010 |
| JP | 2012-043546 A | 3/2012 |
| JP | 2016-021332 A | 2/2016 |
| KR | 10-2005-0090219 A | 9/2005 |
| KR | 10-2012-0109080 A | 10/2012 |
| KR | 10-2014-0082036 B1 | 7/2014 |
| KR | 10-2015-0057730 A | 5/2015 |
| KR | 10-2015-0063620 A | 6/2015 |
| KR | 10-2015-0075219 A | 7/2015 |
| KR | 10-2015-0092647 A | 8/2015 |
| KR | 10-1586816 B1 | 1/2016 |
| KR | 10-2016-0030276 A | 3/2016 |
| KR | 10-2016-0128279 A | 11/2016 |
| KR | 10-2017-0053123 A | 5/2017 |
| WO | 2014/178113 A1 | 11/2014 |
| WO | WO 2016/106487 * | 7/2016 |
| WO | 2017/002959 A1 | 1/2017 |

OTHER PUBLICATIONS

Machine translation of JP 2010-170943, published on Aug. 5, 2010 (Year: 2010).*
International Search Report issued in corresponding International Patent Application No. PCT/KR2018/016253, dated Apr. 15, 2019.
Extended European Search Report issued from the European Patent Office dated Aug. 18, 2020 in corresponding European patent application No. 18890772.9.

* cited by examiner

*Primary Examiner* — Anca Eoff
(74) *Attorney, Agent, or Firm* — Morgan, Lewis & Bockius LLP

(57) ABSTRACT

Provided is a negative electrode active material including secondary particles assembled from silicon composite primary particles represented by Mg—SiO$_x$ (0<x<2) and artificial graphite primary particles, wherein the secondary particles assembled from silicon composite primary particles and artificial graphite primary particles are surface-coated with an amorphous carbon coating layer. The lithium secondary battery using the negative electrode active material can retain conductivity even after charge/discharge and can be prevented from degradation of cycle characteristics.

10 Claims, 1 Drawing Sheet

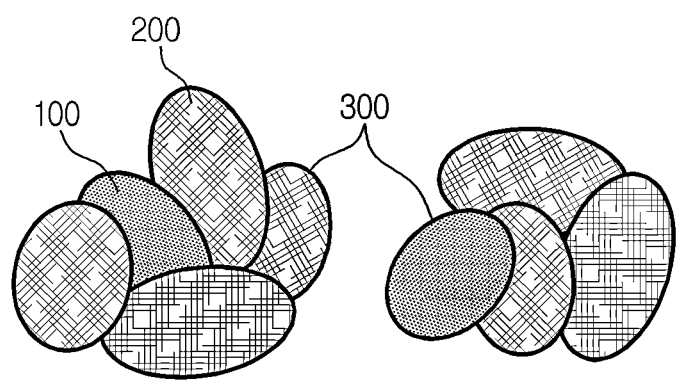

NEGATIVE ELECTRODE ACTIVE MATERIAL FOR LITHIUM SECONDARY BATTERY, METHOD FOR PREPARING THE SAME AND LITHIUM SECONDARY BATTERY OBTAINED BY USING THE SAME

CROSS-REFERENCE TO RELATED APPLICATIONS

The present application is a National Stage application under 35 U.S.C. § 371 of the International Patent Application No. PCT/KR2018/016253 filed on Dec. 19, 2018, which claims priority to the Korean Patent Application No. 10-2017-0175510 filed on Dec. 19, 2017 in the Republic of Korea, the disclosure of Korean Patent Application No. 10-2017-0175510 is incorporated herein by reference.

TECHNICAL FIELD

The present disclosure relates to a negative electrode active material for a lithium secondary battery, a method for preparing the same and a lithium secondary battery obtained by using the same.

BACKGROUND ART

Carbonaceous materials used as negative electrode active materials for lithium secondary batteries are broadly classified into crystalline graphite materials and amorphous graphite materials. Typical examples of crystalline graphite materials include artificial graphite, natural graphite and Kish graphite, and those of amorphous graphite materials include soft carbon obtained by firing coal pitch or petroleum pitch at high temperature, hard carbon obtained by firing polymer resins, such as phenolic resins, or the like.

Recently, $SiO_x$-based particles having high capacity have been incorporated to such carbonaceous materials in order to overcome the low capacity of carbonaceous materials.

Silicon oxide ($SiO_x$) forms a structure in which silicon crystals having a size of several nanometers are dispersed homogeneously in silicon oxide, while it is decomposed into Si and $SiO_2$ by disproportionation at a high temperature of 1,000° C. or higher. It is expected that when applying such silicon oxide to a negative electrode active material for a secondary battery, its capacity corresponds to approximately a half of the capacity of a silicon negative electrode active material but a capacity approximately 5 times higher than the capacity of a carbonaceous negative electrode active material, and it shows a small change in volume structurally to provide excellent cycle life characteristics. However, silicon oxide reacts with lithium upon the initial charge to produce lithium silicide and lithium oxide (lithium oxide and lithium silicate). Particularly, lithium oxide cannot participate in the subsequent electrochemical reaction and a part of lithium transported to a negative electrode upon the initial charge cannot be returned to a positive electrode, and thus irreversible reaction occurs. In the case of silicon oxide, it shows high irreversible capacity as compared to the other silicon-based negative electrodes and provides a significantly low initial charge efficiency (ICE, ratio of initial discharge capacity to charge capacity) of 70-75%. Such low initial charge efficiency requires excessive capacity of a positive electrode when manufacturing a secondary battery to cause a setoff of the capacity per unit weight of a negative electrode. Therefore, high-efficiency $SiO_x$ doped with Li or Mg has been used in order to overcome such low initial charge efficiency of $SiO_x$.

However, when a negative electrode active material is prepared by mixing a carbonaceous material with $SiO_x$-based particles simply, it is difficult for the $SiO_x$-based particles to be distributed homogeneously in the carbonaceous material particles, particularly graphite particles, due to the high aggregation property of $SiO_x$-based particles.

In addition, $SiO_x$-based particles show a higher swelling/shrinking degree and lower electrical conductivity as compared to graphite particles. Thus, it is required to improve technology for retaining conductivity after charge/discharge in order to prevent degradation of cycle characteristics.

DISCLOSURE

Technical Problem

The present disclosure is designed to solve the problems of the related art, and therefore the present disclosure is directed to providing a negative electrode active material including graphite particles in combination with $SiO_x$-based particles, wherein the $SiO_x$-based particles are dispersed homogeneously therein, and a method for preparing the same.

The present disclosure is also directed to providing a lithium secondary battery using a negative electrode active material including graphite particles in combination with $SiO_x$-based particles, wherein the $SiO_x$-based particles are prevented from an electrical short-circuit caused by swelling/shrinking after charge/discharge and increased side reaction of an electrolyte.

Technical Solution

According to the first embodiment of the present disclosure, there is provided a negative electrode active material including secondary particles assembled from primary particles, wherein the primary particles are silicon composite primary particles represented by Mg—$SiO_x$ (0<x<2) and artificial graphite primary particles, the artificial graphite primary particles and the silicon composite primary particles are mixed at a weight ratio of 80:20-96:4 (artificial graphite primary particles:silicon composite primary particles), and the assembled secondary particles are coated with an amorphous carbon coating layer.

According to the second embodiment of the present disclosure, there is provided the negative electrode active material as defined in the first embodiment, wherein the artificial graphite primary particles and the silicon composite primary particles are mixed at a weight ratio of 90:10-96:4 (artificial graphite primary particles:silicon composite primary particles).

According to the third embodiment of the present disclosure, there is provided the negative electrode active material as defined in the first or the second embodiment, wherein the silicon composite primary particles include i) Si, ii) silicon oxide represented by $SiO_x$ (0<x≤2) and iii) Mg silicate containing Si and Mg.

According to the fourth embodiment of the present disclosure, there is provided the negative electrode active material as defined in any one of the first to the third embodiments, wherein the silicon composite primary particles have an average particle diameter ($D_{50}$) of 3-6 μm.

According to the fifth embodiment of the present disclosure, there is provided the negative electrode active material as defined in the first to the fourth embodiments, wherein the amorphous carbon coating layer has a thickness of 10-150 nm.

According to the sixth embodiment of the present disclosure, there is provided the negative electrode active material as defined in the first to the fifth embodiments, wherein the secondary particles have an average particle diameter of 15-23 μm.

According to the seventh embodiment of the present disclosure, there is provided a lithium secondary battery provided with a negative electrode including the negative electrode active material as defined in any one of the first to the sixth embodiments.

According to the eighth embodiment of the present disclosure, there is provided a method for preparing the negative electrode active material as defined in the first embodiment, including the steps of: preparing artificial graphite primary particles and silicon composite primary particles in such a manner that the weight ratio of the artificial graphite primary particles to the silicon composite primary particles may be 80:20-96:4; mixing and heat treating the silicon composite primary particles, artificial graphite primary particles and a binder polymer to assemble secondary particles; and heat treating the assembled secondary particles under $N_2$ atmosphere.

According to the ninth embodiment of the present disclosure, there is provided the method as defined in the eighth embodiment, wherein the silicon composite primary particles are obtained by allowing each of $Si/SiO_2$ and metal Mg to evaporate and mixing them in a gaseous state, followed by cooling.

According to the tenth embodiment of the present disclosure, there is provided the method as defined in the eighth or the ninth embodiment, wherein the artificial graphite primary particles are obtained by pulverizing needle-like petroleum coke and carrying out graphitization at a temperature of 2500-3200° C. under $N_2$ atmosphere.

Advantageous Effects

In the negative electrode active material including graphite primary particles in combination with silicon composite primary particles according to an embodiment of the present disclosure, the silicon composite primary particles and graphite primary particles are used at a predetermined ratio and assembled into secondary particles. Thus, the silicon composite particles can be dispersed homogeneously in the negative electrode active material.

In addition, in the lithium secondary battery using the negative electrode active material according to an embodiment of the present disclosure, the silicon composite primary particles and the artificial graphite primary particles are coated with amorphous carbon. Thus, even when the side reaction between graphite and an electrolyte is increased after charge/discharge, it is possible to prevent the silicon composite particles from an electrical short-circuit.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shape, dimension, scale or proportion of an element in the accompanying drawings may be exaggerated for the purpose of clearer description.

The FIGURE is a schematic view illustrating the secondary particles of negative electrode active material assembled from silicon composite primary particles and artificial graphite primary particles according to an embodiment of the present disclosure.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a negative electrode active material including secondary particles assembled from silicon composite primary particles and artificial graphite primary particles, wherein the secondary particles are at least partially, preferably totally, surface-coated with an amorphous carbon coating layer.

As used herein, the term 'primary particle' means the initial particle when another type of particle is formed from one type of particle, and a plurality of primary particles may be aggregated, bound or assembled to form secondary particles.

As used herein, the term 'secondary particle' means a large particle formed by aggregation, binding or assemblage of individual primary particles and capable of being differentiated physically.

As used herein, the term 'assembling' of primary particles means a process in which a plurality of primary particles is aggregated or agglomerated spontaneously or artificially to be converted into secondary particles by forming aggregates consisting of the primary particles, and may be used exchangeably with the term 'aggregation' or 'binding' having the same meaning.

According to an embodiment of the present disclosure, the silicon composite primary particles may include $SiO_x$ (0<x<2) doped with or chemically bound with Mg, and thus may be represented by $Mg—SiO_x$ (0<x<2). More particularly, the silicon composite primary particles may be a plurality of primary particles consisting of i) Si, ii) silicon oxide represented by $SiO_x$ (0<x≤2) and iii) metal silicate containing Si and Mg.

Hereinafter, the negative electrode active material according to the present disclosure will be explained with reference to the FIGURE. Silicon composite primary particles 100 and artificial graphite primary particles 200 assemble and form secondary particles of the negative electrode active material, and the surfaces of the secondary particles are coated with an amorphous carbon coating layer 300.

In the silicon composite, x representing oxygen content may be 1. In addition, there is no particular limitation in content of element M, as long as it does not affect the function of silicon significantly. For example, 1 mole or less of M may be present based on 1 mole of silicon atoms.

In general, silicon particles induce a significantly complicated crystal change in the reaction of electrochemical intercalation and deintercalation of lithium atoms. As the reaction of electrochemical intercalation and deintercalation of lithium atoms proceeds, the composition and crystal structure of silicon particles are changed into Si (crystal structure: Fd3m), LiSi (crystal structure: 141/a), $Li_2Si$ (crystal structure: C2/m), $Li_7Si_2$ (Pbam), $Li_{22}Si_5$ (F23), or the like. According to such a complicated change in crystal structure, the volume of silicon particles is expanded to about 4 times of the initial volume. The silicon composite used herein has a structure including Mg metal atoms in addition to silicon oxide, and thus shows a smaller change in volume as compared to silicon particles. However, due to the presence of Mg metal atoms, the silicon composite causes a more severe problem of swelling/shrinking during charge/discharge, as compared to silicon oxide.

The silicon composite includes, as a main ingredient, primary particles having an average particle diameter ($D_{50}$) of 3-6 μm. Herein, the average particle diameter ($D_{50}$) of the primary particles may be determined by microscopic analysis, such as scanning electron microscopy (SEM) or transmission electron microscopy (TEM), and may be defined as the particle diameter at the 50% point in a particle diameter distribution. The term 'main ingredient' means that 90% or more (on the number basis) of primary particles have a particle diameter of 3-6 μm in at least one view in the microscopic analysis.

The silicon composite includes a matrix containing Mg-silicon oxide; and a plurality of crystalline silicon phases dispersed and scattered in the matrix; wherein the silicon phases are dispersed and distributed homogeneously in the matrix containing Mg-silicon oxide. According to the present disclosure, the silicon phases are embedded in the matrix. The silicon phase is a group assembled from one or more silicon crystals, and one group or two or more groups may be present.

According to the present disclosure, the matrix is an ingredient inactive to Li, and causes no Li intercalation/deintercalation during the charge of a battery. Si forms a composite with Li to contribute to charge/discharge of a battery, but has a problem of an excessively large change in volume after charge/discharge. To solve the problem, negative electrode materials including microcrystals of Si or a composite of Si with $SiO_2$ have been developed. However, there is a problem in that $LiO_2$ or Li—S—O is formed upon the initial charge in the case of $SiO_2$ to cause irreversible capacity. Therefore, the present disclosure was created based on the fact that incorporation of a metal element, having a binding force to oxygen equal to or higher than the binding force of Li to oxygen, into the matrix can reduce the initial irreversible capacity. According to the present disclosure, the matrix includes metal Mg-silicon composite oxide and silicon oxide (SiOx ($0<x\leq2$)). The metal (M)-silicon composite oxide includes magnesium silicate (Mg-silicate), and the Mg-silicate includes at least one of $MgSiO_3$ and $Mg_2SiO_4$. In the matrix, the elements of each phase of the metal silicate and silicon oxide are diffused and bound to each other on the boundary surface of each phase. In other words, one phase is bound to another phase at an atomic level. Thus, the matrix shows a small change in volume upon lithium ion intercalation and deintercalation and little cracking occurs in the composite particles even after repeating charge/discharge.

When using Li instead of Mg in the silicon composite primary particles according to the present disclosure, Li has high reactivity with water. Thus, when manufacturing a negative electrode by using water as a dispersion medium for negative electrode active material slurry, the negative electrode generates gas during charge/discharge. For this reason, when using Li-doped silicon composite particles for a negative electrode active material, a process for surface treatment of the particles is required.

In addition, when using Al instead of Mg in the silicon composite primary particles according to the present disclosure, there is a problem in that doping cannot be performed well.

Further, according to an embodiment of the present disclosure, metal Mg is present in an amount of 4-20 wt %, 4-16 wt %, or 4-10 wt %, based on 100 wt % of the silicon composite primary particles. When the content of the metal Mg satisfies the above-defined range, it is possible to improve efficiency while minimizing a decrease in capacity. In addition, the amorphous carbon coating layer is used in an amount of 2-7 wt % based on the total weight of 100 wt % of the silicon composite primary particles.

According to an embodiment of the present disclosure, the Si crystallites in the matrix may have a size of 1-15 nm, preferably. The Si crystal size is larger than the above-defined range, life characteristics may be degraded. Meanwhile, it is preferred that $SiO_x$ is micronized to such a degree that no crystallinity can be observed through X-ray diffractometry (XRD).

The silicon composite primary particles may be crystalline or amorphous.

Artificial graphite that may be used herein may be artificial graphite used conventionally in the art. Preferably, it may be artificial graphite in the form of primary particles graphitized at a temperature of 2500° C. or higher by using coke as a raw material. Such artificial graphite may have an average particle diameter ($D_{50}$) of 6-12 μm. When artificial graphite particles have an average particle diameter less than 6 μm, it is not easy to perform pulverization into a desired size and a larger amount of energy is required. When artificial graphite particles have an average particle diameter larger than 12 μm, it takes a long time for lithium to be diffused into the negative electrode active material layer, resulting in degradation of a charge/discharge rate. Artificial graphite may have a scaly shape, spherical shape, or the like, but is not limited thereto.

Primary particles of artificial graphite may have a BET surface area of 0.4-5 $m^2/g$ or 0.5-3.5 $m^2/g$. When the BET surface area is within the above-defined range, it is possible to ensure a large contact area with an electrolyte solution without excessive use of a binder polymer, and thus to facilitate lithium intercalation/deintercalation, resulting in a decrease in reaction resistance of a battery.

Artificial graphite primary particles and silicon composite primary particles may be used at a weight ratio of 80:20-96:4 (artificial graphite primary particles: silicon composite primary particles) and assembled into secondary particles. When artificial graphite primary particles are used in an amount less than 80 wt %, cycle characteristics may be degraded undesirably. When artificial graphite primary particles are used in an amount larger than 96 wt %, it is difficult to provide a high-capacity battery.

As a binder polymer, coal/petroleum pitch or resin used currently in the art may be used, and non-limiting examples thereof include glucose, fructose, galactose, maltose, lactose, sucrose, phenolic resin, naphthalene resin, polyvinyl alcohol resin, urethane resin, polyimide resin, furan resin, cellulose resin, epoxy resin, polystyrene resin, resorcinol resin, phloroglucinol resin, coal-based pitch, petroleum-based pitch, tar, low-molecular weight heavy oil or combinations thereof. However, the scope of the present disclosure is not limited thereto.

The binder polymer may be used in an amount of 3-15 parts by weight based on 100 parts by weight of the combined weight of silicon composite and artificial graphite.

Secondary particles including the silicon composite primary particles, artificial graphite primary particles and the binder polymer may have an average particle diameter ($D_{50}$) of 15-23 μm, or 16-21 μm. When the secondary particles are smaller than 15 μm, secondary particles are not formed well to cause an increase in electrode orientability, resulting in an increase in swelling and resistance. When the secondary particles are larger than 23 μm, tap density is reduced excessively, thereby making it difficult to perform slurry and electrode coating. As used herein, 'average particle diameter' means a value determined as the average weight $D_{50}$ (particle diameter or median diameter when the accumulated weight is 50% of the total weight) in the determination of particle size distribution based on the laser light diffraction method.

According to an embodiment of the present disclosure, there is provided a method for preparing a negative electrode active material, including the steps of: preparing silicon composite primary particles and artificial graphite primary particles; mixing the silicon composite primary particles, the artificial graphite primary particles and a binder polymer to assemble secondary particles; and heat treating the assembled secondary particles.

Hereinafter, the method will be explained in more detail.

To prepare silicon composite primary particles, Si/SiO$_2$ and metal Mg are allowed to evaporate individually and are mixed in a gaseous state. For example, Si/SiO$_2$ is heat treated at a predetermined ratio, such as a weight ratio of 1:1, at 1000-1800° C. to obtain SiO gas. In addition, Mg is heat treated at 800-1600° C. to obtain Mg gas.

The reaction of SiO$_x$ (0<x<2) gas with metal (M) gas may be carried out at 800-1800° C. Then, quenching may be carried out to a target cooling temperature of 400-900° C., particularly 500-800° C., within 1-6 hours. When the quenching time satisfies the above-defined range after the vapor phase reaction of SiO$_x$ (0<x<2) gas with metal (M) gas, such quenching to a low temperature within a short time can solve the problem of insufficient reaction of gaseous metal (M) with SiO$_x$ which results in a failure in formation of silicate and a residual undesired phase, such as MgO. Thus, it is possible to significantly improve the initial efficiency and an effect of preventing swelling, thereby providing significantly improved life of a battery. A cooling plate may be used to perform cooling. After cooling, additional heat treatment may be further carried out, wherein the size of Si crystallites and Mg silicate proportion may be controlled depending on heat treatment temperature. For example, when the additional heat treatment is carried out at high temperature, Mg$_2$SiO$_4$ phase may be increased and the Si crystallite size may be increased.

According to an embodiment of the present disclosure, a vapor deposition reactor may be used to prepare the silicon composite primary particles. For example, such a vapor deposition reactor may include a fill port, gas suction port and a discharge port connected to a deposition chamber. As carrier gas, hydrogen, helium, nitrogen, argon or a combination thereof may be used. While the carrier gas is introduced to the vapor deposition reactor through the gas suction port, a precursor compound forming the silicon composite primary particles may also be introduced into the reactor together with the carrier gas. Then, while the precursor compound is adsorbed chemically onto the substrate surface in the reactor, materials of silicon composite primary particles may be deposited in a bulk state.

According to an embodiment of the present disclosure, the deposited silicon oxide composite may include a crystalline silicon phase and a matrix in which the silicon phases are embedded scatteredly, wherein the matrix includes Mg-silicate and silicon-oxide. In addition, it is possible to form the silicon phase and matrix into a size corresponding to microcrystals of 30 nm or less, 9-20 nm, or 9-15 nm by selecting a composition similar to the composition at the eutectic point.

Next, the deposited 'Mg—SiO$_x$ (0<x<2)' is pulverized to a particle diameter ($D_{50}$) of 3-6 μm through a mechanical milling process, or the like.

Artificial graphite primary particles may be obtained by pulverizing coke, graphitizing the pulverized coke at a temperature of 2500° C. or higher, preferably 2500-3200° C., and more preferably about 3000° C., under N$_2$ atmosphere for 12-48 hours, preferably for 24 hours, and carrying out cooling gradually to room temperature (25° C.). The coke may be petroleum-based needle-like coke.

According to an embodiment of the present disclosure, a process for coating each of the silicon composite primary particles and artificial graphite primary particles with carbon is not included.

To obtain the secondary particles including the silicon composite primary particles, the artificial graphite primary particles and a binder polymer, the silicon composite primary particles and the artificial graphite primary particles are mixed with the binder polymer and the mixture is heat treated at a low temperature of 600-700° C. or 630-700° C. Then, a part of volatile binder polymer evaporates and the mixture is turned into a viscous sticky state, while the particles are aggregated into the form of secondary particles to provide assembled secondary particles. Herein, a system provided with a rotating blade and an exhaust device may be used to facilitate assemblage of secondary particles.

Then, while the secondary particles are carbonized through heat treatment at a temperature of 800-1200° C., preferably about 1000° C., under N$_2$ atmosphere for 2-3 hours, an amorphous carbon coating layer is formed, wherein the binder polymer, such as pitch, performs a binding function in the secondary particles. The amorphous carbon coating layer may be present in an amount of 2-7 wt % based on 100 wt % of the total weight of the secondary particles.

Meanwhile, according to an embodiment of the present disclosure, the amorphous carbon coating layer may have a thickness of 10-150 nm. Within the above-defined range, the upper limit of thickness may be 100 nm, 80 nm, 70 nm or 50 nm and the lower limit of thickness may be 15 nm, 25 nm, 35 nm or 50 nm.

The secondary particles of negative electrode active material, which are assembled particles of silicon composite and artificial graphite and coated with the amorphous carbon coating layer according to an embodiment of the present disclosure, are dispersed in a solvent together with a binder polymer and a conductive material to form negative electrode mixture slurry, and the slurry is coated onto at least one surface of a negative electrode current collector, followed by pressing and drying, to obtain a negative electrode.

The binder polymer is used to bind active material particles and to retain a shaped product. Non-limiting examples of the binder polymer include polytetrafluoroethylene (PTFE), polyvinylidene fluoride (PVdF), and styrene butadiene rubber (SBR). Such binder polymers are classified into a solvent-based binder polymer (i.e., binder using an organic solvent as a solvent) such as polyvinylidene fluoride (PVdF) and an aqueous binder polymer (i.e. binder using water as a solvent) such as styrene-butadiene rubber. The aqueous binder polymer is economical and eco-friendly and is not harmful to the worker's health, unlike the solvent-based binder polymer. In addition, the aqueous binder polymer has a higher binding effect as compared to the solvent-based binder polymer, and thus can increase the ratio of active material per the same volume to provide high capacity. Preferably, the aqueous binder polymer is SBR. As widely known in the art, such an aqueous binder polymer may be dispersed in water together with a thickening agent such as carboxymethyl cellulose (CMC) so that it may be applied to an electrode.

There is no particular limitation in the conductive material, as long as it causes no chemical change in an electrochemical device. In general, particular examples of the conductive material include acetylene black, carbon black, denka black, graphite, carbon fibers, carbon nanotubes, metal powder, conductive metal oxide, organic conductive material, or the like.

The solvent used for forming an electrode may include an organic solvent, such as N-methyl pyrrolidone (NMP), dimethyl formamide (DMF), acetone or dimethyl acetamide, or water. Such solvents may be used alone or in combination. However, when forming a negative electrode, water is used preferably as a solvent. It is preferred that the solvent is used in such an amount that the electrode active material, binder polymer and conductive material may be dissolved and dispersed therein, considering the coating thickness of slurry and production yield.

The negative electrode forms an electrode assembly together with a positive electrode including a positive electrode active material and a separator, and the electrode assembly and an electrolyte are received in a casing to provide a lithium secondary battery.

The positive electrode active material may be selected from a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+y}Mn_{2-y}O_4$ (wherein y is 0-0.33), $LiMnO_3$, $LiMn_2O_3$ or $LiMnO_2$; a lithium copper oxide ($Li_2CuO_2$); a vanadium oxide such as $LiV_3O_8$, $Li_3VO_4$, $V_2O_5$ or $Cu_2V_2O_7$; a Ni-site type lithium nickel oxide represented by the chemical formula of $LiNi_{1-y}M_yO_2$ (wherein M is Co, Mn, Al, Cu, Fe, Mg, B or Ga, and y is 0.01-0.3); a ternary lithium manganese composite oxide represented by the chemical formula of $LiMn_{2-y}M_yO_2$ (wherein M=Co, Ni, Fe, Cr, Zn or Ta, and y is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; ternary lithium transition metal composite oxide represented by the chemical formula of $Li(Ni_aCo_bMn_c)O_2$ (0<a<1, 0<b<1, 0<c<1, a+b+c=1); or the like, but is not limited thereto.

The positive electrode active material may be dispersed in an organic solvent together with a binder polymer, conductive material and other additives to form positive electrode mixture slurry, and the slurry may be coated onto at least one surface of a positive electrode current collector, followed by drying and pressing, to form a positive electrode. The binder polymer, conductive material and other additives used for the positive electrode may be the same as or different from those used for the negative electrode. See, the above description with reference to the negative electrode.

Non-limiting examples of the positive electrode current collector include foil made of aluminum, nickel or a combination thereof, and those of the negative electrode current collector include foil made of copper, gold, nickel, copper alloy or a combination thereof.

The electrolyte includes conventional electrolyte ingredients, such as an electrolyte salt and an organic solvent. The electrolyte salt that may be used is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a combination thereof may be used.

The organic solvent used in combination with the electrolyte may include a currently known solvent, such as a cyclic carbonate solvent; liner carbonate solvent; ester solvent; nitrile solvent; phosphate solvent; or a combination thereof, wherein the solvent may include a halogen substituent or not. For example, the organic solvent that may be used includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof.

The lithium secondary battery according to an embodiment of the present disclosure may be provided in the form of a cylindrical, prismatic, pouch-type or coin-type battery, but its outer shape or casing is not limited thereto.

The lithium secondary battery according to an embodiment of the present disclosure may include any conventional lithium secondary batteries, such as a lithium metal secondary battery, lithium ion secondary battery, lithium polymer secondary battery or a lithium ion polymer secondary battery.

Mode for Disclosure

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Powdery Si and $SiO_2$ were mixed at a ratio (molar ratio) of 1:1 and heat treated under reduced pressure of 1 torr to allow the mixture in a vapor state of $SiO_x$ (0<x<2). Mg was also allowed to evaporate in a vapor state. Next, gaseous Mg was allowed to react with $SiO_x$ (0<x<2) at 1300° C. for 3 hours. Then, the reaction product was cooled to 800° C. within 4 hours so that it might be deposited on the substrate. The evaporation temperature of Si/$SiO_2$ was 1,400° C. and that of Mg was 900° C. The deposited product was silicon composite primary particles doped with or chemically bound with Mg (Mg—$SiO_x$, 0<x<2). The deposited product in a bulk state was pulverized by using a jet mill to a diameter ($D_{50}$) of about 5 μm.

Petroleum-based needle-like coke was used as a raw material. The coke was pulverized and pulverized coke was graphitized at a temperature of 3000° C. to obtain artificial graphite primary particles ($D_{50}$=8 μm).

Then, 90 g of the artificial graphite primary particles obtained as described above, 10 g of the silicon composite primary particles (Mg—SiO$_x$, 0<x<2) and 10 g of a pitch binder polymer were mixed. 'Mg—SiO$_x$ (0<x<2)' is primary particles including Si, SiO$_x$ (0<x≤2) and Mg silicate as nano-domains. The materials were assembled into secondary particles at a temperature of 630° C. and heat treated at a temperature of 1000° C. under N$_2$ atmosphere to obtain a negative electrode active material including secondary particles assembled from the silicon composite primary particles (Mg—SiO$_x$, 0<x<2) and artificial graphite primary particles, wherein the surfaces of the secondary particles were totally surface-coated with an amorphous carbon coating layer. The secondary particles of negative electrode active material had an average particle diameter ($D_{50}$) of 20.6 μm, and the amorphous carbon coating layer had a thickness of 40 nm. The thickness of the amorphous carbon coating layer was determined by transmission electron microscopy (TEM).

The negative electrode active material, a conductive material and an organic binder polymer were used at a weight ratio of 96:1:3 and dispersed in water to prepare a negative electrode mixture. As the conductive material, Super C65 (available from TIMCAL) carbon black was used. As the organic binder polymer, carboxymethyl cellulose (CMC) was used in combination with styrene-butadiene rubber (SBR). The negative electrode mixture was applied to copper foil as a negative electrode current collector having a thickness of 10 μm, followed by drying, to obtain a negative electrode sample. Then, roll pressing was carried out. Herein, the negative electrode had a loading amount of 250 mg/25 cm$^2$ and the roll pressing was carried out so that the negative electrode might have an electrode density of 1.5 g/cc.

Lithium metal was used as a positive electrode, a polypropylene separator was used and an electrolyte was injected to obtain a coin-type half secondary cell (CHC).

Comparative Example 1

Petroleum-based needle-like coke was used as a raw material and graphitized at a temperature of 3000° C. to obtain primary particles of artificial graphite ($D_{50}$=8 μm). A lithium secondary battery was obtained in the same manner as Example 1, except that 1) 100 g of the obtained artificial graphite primary particles was mixed with 10 g of the pitch binder polymer and the mixture was carbonized at 1000° C., and independently from this, 2) 100 g of the same silicon composite primary particles (Mg—SiO$_x$, 0<x<2) as used in Example 1 was mixed with 10 g of the pitch binder polymer and the mixture was carbonized at 1000° C. Then, 1) and 2) were mixed at a weight ratio of 9:1 to provide a negative electrode active material. Therefore, the negative electrode active material according to Comparative Example 1 are used in the form of silicon composite primary particles (Mg—SiO$_x$, 0<x<2) and artificial graphite primary particles.

Comparative Example 2

An active material and a lithium secondary battery were obtained in the same manner as Example 1, except that scaly natural graphite ($D_{50}$=7 μm) was used instead of artificial graphite and was assembled into secondary particles in combination with silicon composite primary particles (Mg—SiO$_x$, 0<x<2). In this manner, a negative electrode active material, including secondary particles assembled from silicon composite primary particles (Mg—SiO$_x$, 0<x<2) and scaly natural graphite primary particles and surface-coated with an amorphous carbon coating layer, was obtained. The secondary particles of negative electrode active material had an average particle diameter ($D_{50}$) of 19.5 μm, and the amorphous carbon coating layer had a thickness of 40 nm.

Comparative Example 3

An active material and a lithium secondary battery were obtained in the same manner as Example 1, except that 70 g of artificial graphite, 30 g of silicon composite primary particles (Mg—SiO$_x$, 0<x<2) and 10 g of the pitch binder polymer were used and assembled into secondary particles. An amorphous carbon coating layer was formed on the surfaces of the secondary particles assembled from silicon composite primary particles (Mg—SiO$_x$, 0<x<2) and artificial graphite primary particles. The secondary particles of negative electrode active material had an average particle diameter ($D_{50}$) of 22 μm, and the amorphous carbon coating layer had a thickness of 45 nm.

Test Example 1: Charge/Discharge Cycle Test

Each of the lithium secondary batteries according to Example 1 and Comparative Examples 1-3 was subjected to charge/discharge at the first cycle at 0.1 C/0.1 C and 25° C., and then subjected to charge/discharge cycles at 3 C charge/0.5 C discharge and 25° C. for the next 49 cycles to determine capacity maintenance.

Then, each lithium secondary battery was charged at 0.1 C and the coin cell was disassembled and washed with dimethyl carbonate (DMC) to determine the swelling ratio of each negative electrode. The results are shown in the following Table 1. Hereinafter, 'fresh negative electrode' means a negative electrode before carrying out charge/discharge, i.e. negative electrode right before being assembled into a coin cell.

Negative electrode swelling ratio=[(Negative electrode thickness after 50 cycles when charged at 0.1 C−Fresh negative electrode thickness)/Fresh negative electrode thickness]×100

TABLE 1

| | Capacity maintenance (%) after 0.1 C/0.1 C First cycle + 3 C/0.5 C 49 cycles | Negative electrode swelling ratio (%) |
| --- | --- | --- |
| Ex. 1 | 87.3 | 52.3 |
| Comp. Ex. 1 | 83.9 | 58.2 |
| Comp. Ex. 2 | 85.4 | 63.2 |
| Comp. Ex. 3 | 80.1 | 71.8 |

It can be seen from the above results that the lithium secondary battery according to Example 1 shows higher capacity maintenance after 49 cycles and has the lowest negative electrode swelling ratio, as compared to the lithium secondary batteries according to Comparative Examples 1-3.

What is claimed is:
1. A negative electrode active material comprising secondary particles assembled from primary particles, wherein the primary particles comprise silicon composite primary particles represented by Mg—$SiO_x$ ($0<x<2$) and artificial graphite primary particles, a weight ratio of the artificial graphite primary particles to the silicon composite primary particles is 80:20-96:4, and the secondary particles are coated with an amorphous carbon coating layer.

2. The negative electrode active material according to claim 1, wherein the weight ratio of the artificial graphite primary particles to the silicon composite primary particles is 90:10-96:4.

3. The negative electrode active material according to claim 1, wherein the silicon composite primary particles comprise:
 (i) silicon (Si);
 (ii) silicon oxide represented by $SiO_x$ ($0<x\le2$); and
 (iii) magnesium silicate containing Si and Mg.

4. The negative electrode active material according to claim 1, wherein an average particle diameter ($D_{50}$) of the silicon composite primary particles is 3-6 μm.

5. The negative electrode active material according to claim 1, wherein a thickness of the amorphous carbon coating layer is 10-150 nm.

6. The negative electrode active material according to claim 1, wherein an average particle diameter of the secondary particles is 15-23 μm.

7. A lithium secondary battery comprising a negative electrode comprising the negative electrode active material according to claim 1.

8. A method for preparing the negative electrode active material according to claim 1, comprising:
 preparing a mixture of artificial graphite primary particles and silicon composite primary particles having a weight ratio of the artificial graphite primary particles to the silicon composite primary particles of 80:20-96:4;
 mixing and heat treating the mixture of the silicon composite primary particles and the artificial graphite primary particles, and a binder polymer to assemble as secondary particles; and
 heat treating the assembled secondary particles under $N_2$ atmosphere.

9. The method according to claim 8, wherein the silicon composite primary particles are prepared by
 evaporating a mixture of Si and $SiO_2$ and a metallic Mg,
 mixing the mixture of Si and $SiO_2$ and the metallic Mg in a gaseous state, and
 cooling the silicon composite primary particles obtained.

10. The method according to claim 8, wherein the artificial graphite primary particles are obtained by pulverizing needle-like petroleum coke and carrying out graphitization at a temperature of 2500-3200° C. under a $N_2$ atmosphere.

* * * * *